United States Patent

Grundy

[15] 3,660,680

[45] May 2, 1972

[54] FAIL-SAFE DUTY CYCLE CHECKING CIRCUIT

[72] Inventor: Reed H. Grundy, Murrysville, Pa.

[73] Assignee: Westinghouse Air Brake Company, Swissvale, Pa.

[22] Filed: Sept. 23, 1970

[21] Appl. No.: 74,787

[52] U.S. Cl. ................................307/234, 328/165, 340/253

[51] Int. Cl. ..........................................................H03k 5/18

[58] Field of Search ...........................340/253; 328/162, 165; 307/234

[56] References Cited

UNITED STATES PATENTS

| | | | |
|---|---|---|---|
| 2,428,011 | 9/1947 | Chatterjea et al. | 328/162 |
| 3,585,510 | 6/1971 | O'Malley | 328/162 |

FOREIGN PATENTS OR APPLICATIONS

| | | | |
|---|---|---|---|
| 909,205 | 10/1962 | Great Britain | 340/253 |

*Primary Examiner*—John S. Heyman
*Assistant Examiner*—Harold A. Dixon
*Attorney*—H. A. Williamson, A. G. Williamson, Jr. and J. B. Sotak

[57] ABSTRACT

This invention relates to a fail-safe duty cycle checking circuit comprising an amplifier circuit having a first input for receiving a square wave of fixed peak to peak amplitude and a second input for receiving a signal proportional to the duty cycle of the square wave, and an output, a feedback loop connected between the output and first input for providing an upper and a lower hysteresis level which levels shift upward or downward in accordance with the duty cycle of the square wave, the shifting of the hysteresis levels too far upward or too far downward rendering the amplifying circuit incapable of producing an output, and a photosensitive device having a radiant energy source connected in the feedback loop for monitoring its condition. The photosensitive device also has a photopositive resistive element connected to the first and second inputs of the amplifier circuit to assume a high impedance condition whenever the radiant energy source emits no radiant energy thereby rendering any square wave input incapable of producing an output from the amplifying circuit.

20 Claims, 3 Drawing Figures

INVENTOR
Reed H. Grundy.
BY [signature]

INVENTOR
Reed H. Grundy
BY Harold A. Williams

FAIL-SAFE DUTY CYCLE CHECKING CIRCUIT

My invention relates to a fail-safe duty cycle checking circuit, and more particularly to an electronic circuit having an upper and a lower hysteresis level which levels float in accordance with variation of the duty cycle of a square wave input to the circuit, an output produced only when the duty cycle of the square wave input is such that the upper and lower hysteresis levels are within a predetermined range and there is an absence of a critical circuit or component failure.

In various control systems such as for mass and/or rapid transit operations, it is of the utmost importance to exercise extreme care in designing and constructing certain circuits of the system in order to preclude injury to persons and prevent damage to equipment. That is, in order to ensure the highest degree of safety to individuals as well as apparatus, it is necessary and essential that under no circumstances will a failure cause or be capable of causing a true or valid indication. Accordingly, it is readily evident that the apparatus must operate in a fail-safe manner so that any conceivable failure will result in a condition at least as restrictive and, preferably, more restrictive than that preceding the failure. For example, a circuit malfunction or component failure in a speed control system should not be permitted to erroneously simulate and indicate a condition for holding and maintaining vehicle speed. It is also mandatory, in an automatic speed control system of this type to ensure that internally or externally generated noise signals should not be capable of producing an erroneous speed command output signal. It has been found that in tone modulated cab signal control territory a lower frequency tone whose duty cycle has been badly altered could pick up a filter tuned to a higher frequency thus making possible the false operation of vehicle-carried apparatus. Realizing this possibility, most track circuits are maintained such that they transmit to the vehicle a signal that is coded with a 50—50 duty cycle. It is also possible to design equipment such that the filters are chosen in a manner that precludes the possibility of a filter responding to a code of the wrong frequency that does possess the proper duty cycle. There exists, however, the remote possibility of two codes being transmitted simultaneously over the same track or a noise appearing on the track that is periodic in nature. This noise has the interesting phenomenon that it disturbs the duty cycle of the waveform as seen from the output of the receiver. Thus, in order to preclude such adverse operation, a check of the duty cycle of the output receiver waveform is a strong indication as to signal validity. The present invention, therefore, defines and describes a way of determining whether the output waveform is within a predetermined permissible duty cycle range in a vital manner.

It is therefore an object of my invention to provide a fail-safe duty cycle checking circuit which produces an output only when the duty cycle of the input is within a predetermined duty cycle range.

A further object of my invention is to provide a fail-safe duty cycle checking circuit having an amplifier circuit means including regenerative feedback to which is input a floating reference signal proportional to the duty cycle of a square wave input signal, the combination of regenerative feedback and the reference signal providing floating upper and lower hysteresis levels.

Still another object of my invention is to provide a fail-safe duty cycle checking circuit having a feedback type of amplifier and a monitoring device for checking the condition of the feedback loop.

Still a further object of my invention is to provide a fail-safe duty cycle checking circuit including an improved differential amplifier having regenerative feedback for setting the frequency of detectable signals.

Yet a further object of my invention is to provide a fail-safe duty cycle checking circuit have a cascaded amplifier circuit and a differential amplifier circuit including a feedback path and a photosensitive means for monitoring the condition of the feedback path.

Still yet a further object of my invention is to provide a fail-safe duty cycle checking circuit having an output that cannot increase in amplitude.

Yet another object of my invention is to provide a fail-safe duty cycle checking circuit which is simple in design, reliable in operation, durable in use, and efficient in service.

In the attainment of the foregoing objects, a fail-safe duty cycle checking circuit has been invented. The fail-safe duty cycle checking circuit embodied herein comprises a cascaded amplifying circuit having a first and a second stage, each having an input and an output, time averaging means having an input and an output, comparator amplifying circuit means having a first and a second input and an output, a feedback loop, and a photosensitive means. The input of the first stage of the cascaded amplifying circuit receives a square wave input signal and the first stage fixes the peak to peak amplitude of the square wave signal, the output of the first stage having delivered thereto the fixed peak to peak amplitude square wave. The fixed peak to peak amplitude square wave is, in turn, delivered to the input of the second stage of the cascaded amplifying circuit. The second stage attenuates and centers the fixed peak to peak amplitude square wave, which attenuated square wave is produced at the output of the second stage. The input of the time averaging means is electrically connected to the output of the first stage of the cascaded amplifying circuit so that the time averaging means produces an output proportional to the duty cycle of the fixed peak to peak amplitude square wave.

The first input of the comparator amplifying circuit means is electrically connected to the output of the first stage of the cascaded amplifying circuit, while the second input of the amplifying circuit means is electrically connected to the output of the time averaging means. The comparator amplifying circuit means has a differential amplifier stage which includes a positive and a negative input, which are respectively the first and the second inputs to the amplifying circuit means, a switching stage, and a low impedance output stage. The differential amplifier stage of the comparator amplifying circuit comprises a first and a second transistor each having an emitter electrode, a collector electrode, and a base electrode. The base electrode of the first transistor is the positive input of the differential amplifier stage. The collector electrode of the first transistor is electrically connected to a first preselected voltage potential through series connected first and second resistors. The collector electrode of the second transistor is electrically connected to the first preselected voltage potential through a third resistor. The emitter electrodes of the first and second transistors are connected to a second preselected voltage potential through a common fourth resistor. The base electrode of the second transistor is the negative input to the differential amplifier stage and is electrically connected to the output of the time averaging means.

The switching stage of the amplifying circuit means composes a third transistor having an emitter electrode, a collector electrode, and a base electrode. The base electrode of the third transistor is directly connected to the junction of the first and the second resistors. The emitter electrode of the third transistor is connected directly to the first preselected potential. The collector electrode of the third transistor is connected to a third preselected voltage potential which is the level of the lower peak of the fixed peak to peak amplitude square wave.

The low impedance output stage includes a fourth transistor having an emitter electrode, a collector electrode, and a base electrode. The base electrode of the fourth transistor is electrically connected to the collector electrode of the third transistor through a fifth resistor. The collector electrode of the fourth transistor is directly connected to the first preselected voltage potential. The emitter electrode of the fourth transistor is connected to the second preselected voltage potential through series connected sixth and seventh resistors. The output of the amplifying circuit means is taken from the junction of the sixth and seventh resistors.

The feedback loop is connected between the output of the amplifier circuit means and the positive input of the differential amplifier stage for providing an upper and a lower hysteresis level. The time averaging means output is effective to shift the upper and lower hysteresis levels upward whenever the duty cycle of the fixed peak to peak amplitude square wave is greater than a predetermined duty cycle value and downward whenever the duty cycle of the fixed peak to peak amplitude is less than the predetermined duty cycle value.

The photosensitive means has a lamp connected in the feedback loop for monitoring the condition thereof. It also has a photosensitive resistor connected to the input of the first stage of the cascaded amplifying circuit and responsive to the lamp. The photoresistive element assumes a high impedance condition whenever the lamp emits no light to thereby render any square wave input signal incapable of causing an output from the amplifying circuit means during a component failure in the feedback loop.

For a more complete understanding of my invention as well as realizing other objects and advantages therefrom, reference is made to the following detailed description in conjunction with the accompanying drawings in which.

Figure 1:
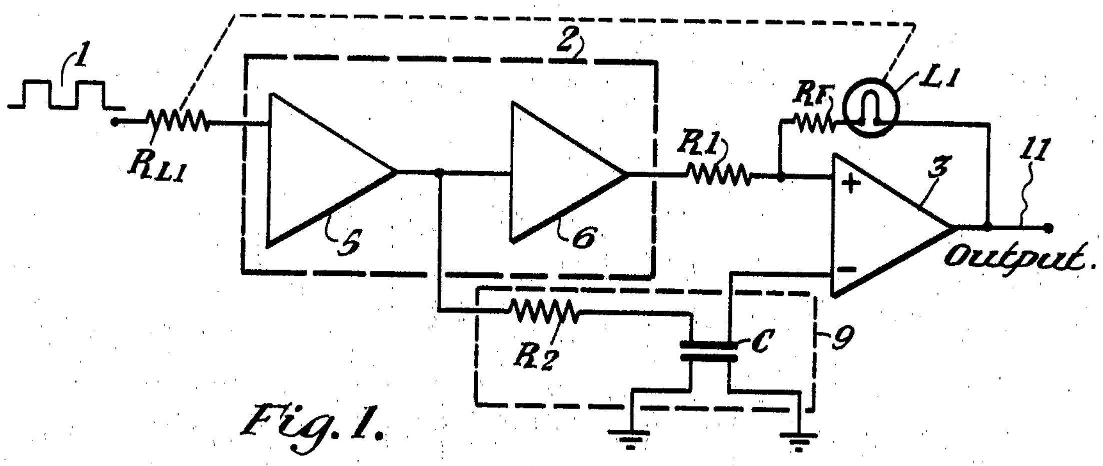
FIG. 1 is a schematic diagram in substantially block form illustrating the fail-safe duty cycle checking circuit embodying the present invention.

Referring now to the drawings and particularly to FIG. 1, there is shown a fail-safe duty cycle checking circuit in accordance with my invention. As shown, the checking circuit is a multi-stage device including a cascaded amplifying circuit 2 including amplifiers 5 and 6 which will be discussed more fully hereafter, and a feedback amplifying device 3. It will be noted that one input to the checking circuit which is a square wave is applied to the positive input terminal of the feedback amplifier 3 through a photopositive resistor $R_{L1}$, the purpose of which will be described in detail hereinafter, and cascaded amplifying means 2. The amplifier 5 of amplifying means 2 power amplifies incoming square wave 1 and references it to a preselected $B^+$ voltage potential, not shown, while fixing the peak to peak amplitude of the incoming wave. Hence, for example, for a square wave input having a 50—50 duty cycle the top end of which is referenced to some preselected $B^+$, the d.c. average would e one-half P—P down from $B^+$ (one-half of the peak to peak amplitude down from the $B^+$ reference voltage). Further, for a square wave having a 60–40 duty cycle the d.c. average would be four-tenths P—P down from $B^+$ and for a square wave having a 40–60 duty cycle, the DC average would be six-tenths P—P down from $B^+$. The output from amplifier 5 is applied as an input to amplifier 6 which includes circuitry not shown in FIG. 1 but to be described later with reference to FIG. 3, for attenuating the square wave output of amplifier 5, thereby reducing its peak to peak amplitude, while maintaining the DC average, or center. This reduced signal appears on the output of amplifier 6 and is applied to the positive terminal of feedback amplifier 3 through a resistor R1. As shown, a second input to the detecting circuit is applied from the output of amplifier 5 through a time averaging means 9 including a resistor R2 and a four terminal capacitor C to the negative terminal of feedback amplifier 3. Accordingly, the reduced square wave output of amplifier 6 is compared in feedback amplifier 3 with the average of the square wave output of amplifier 5, which will be termed the original square wave output, as produced through time-averaging means 9. The output from feedback amplifier 3 is derived via lead 11. A portion of that output is fed back through a light source or lamp L1 and resistor RF to the positive terminal of the feedback amplifier 3. It will be appreciated that the resistor RF may, in fact, be the internal resistance of the lamp L1 or may be some separately added resistance if necessary.

It has been found that by employing a positive feedback type of differential amplifier, by the selection of a proper relation between the feedback and input resistance values, and by the employment of a varying reference signal at the negative input of the amplifier, which is proportional to the duty cycle of a square wave signal at the positive input, one can create a level detector which is insensitive to square wave input signals having duty cycles outside a preselected range, i.e. 50 —50 $\pm X$ percent. That is, the differential amplifier may be designed with built-in floating hysteresis levels, due to variation of the DC reference signal at the negative terminal of the feedback amplifier, which ensures that a particular duty cycle and no others will be detected.

Figure 2:
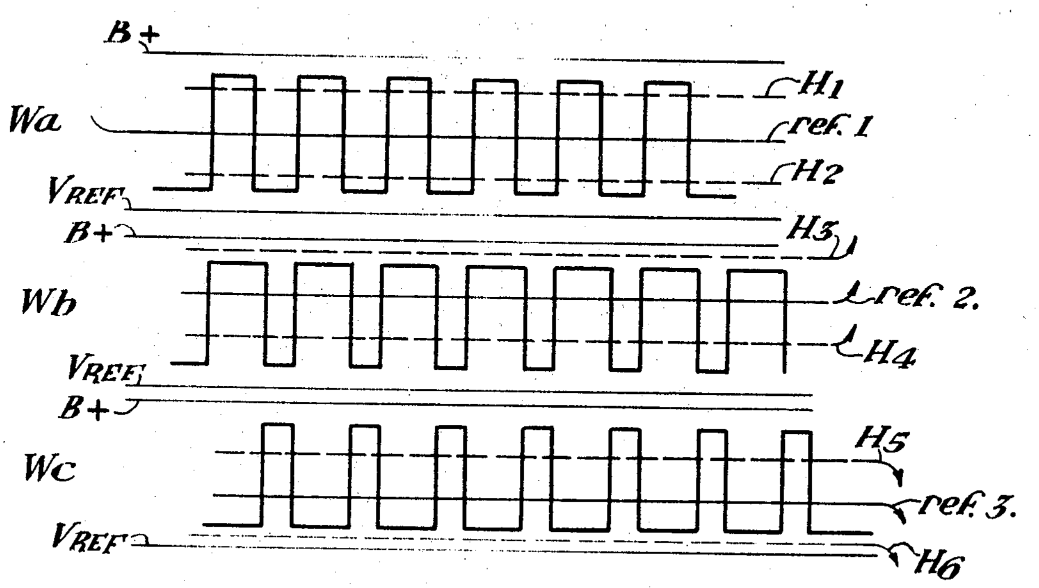
FIG. 2 is a graphic representation of detectable and non-detectable signals associated with the circuit of FIG. 1.

For example, in FIG. 2 there are shown three waveforms including attenuated square wave input signals having different duty cycles. It will be assumed for purposes of explanation that detectable duty cycles will fall within the range of 50—50 $\pm$10 percent. Accordingly, $R_I$ and $R_F$ are chosen such that the displacement of the upper and lower hysteresis levels provided by positive feedback amplifier 3 is 10 percent less than the peak to peak amplitude of the waveform appearing at the output of amplifier 6 for a square wave having a 50—50 duty cycle. Each of the square waves of waveforms $W_a$, $W_b$, and $W_c$ is referenced and fixed in peak to peak amplitude with respect to some $B^+$ and some lower reference voltage $V_{REF}$ via circuitry in cascaded amplifier circuit 2. Accordingly, when the voltage at the negative terminal of the amplifier 3, which is proportional to the time average of the incoming square wave, lies one-half P—P of the original square wave applied at $R_{L1}$ down from $B^+$ there will exist an output from amplifier 3 since the upper and lower hysteresis levels are each intersected by the square wave as shown in FIG. 2 by waveform $W_a$. The hysteresis levels of waveform $W_a$ are designated H1 and H2, while the voltage at the negative terminal of amplifier 3 is represented by ref. 1.

If the voltage level at the negative input terminal of amplifier 3 rises or falls more than 10 percent, for example, due to the presence of a 70—30 or 30–70 duty cycle of the square wave input, the output of amplifier 3 will cease due to the fact that the square wave will no longer intersect both the upper and the lower hysteresis levels respectively, since these levels of hysteresis are referenced with respect to the reference voltage at the negative terminal of feedback amplifier 3. These two situations are illustrated in waveforms $W_b$ and $W_c$, respectively, having hysteresis levels H3 and H4 and reference voltage ref. 2 rising an amount greater than 10 percent, and hysteresis levels H5 and H6 and reference voltage ref. 3 falling an amount greater than 10 percent. Therefore, by applying a voltage at the negative terminal of the feedback amplifier 3 which is proportional to the duty cycle of the square wave at the positive terminal of amplifier 3, the capability of causing cessation of an output of feedback amplifier 3 as the duty cycle of the input square wave deviates from 50—50 $\pm$10 percent is achieved.

However, the necessary fail-safeness of such a circuit arrangement can be achieved only when special precautionary measures are taken to ensure the integrity of the feedback loop. For example, should the feedback circuit of amplifier 3 become open-circuited, infinite impedance would result and the intrinsic hysteresis would be destroyed so that the level detecting ability of the circuit no longer exists. That is, all input duty cycles would be passed by the differential amplifier. In order to prevent such unsafe amplifier operation it is necessary to monitor, or check the presence of a feedback signal, and in the absence of the feedback signal to initiate an input signal loading action. Thus, by employing a photosensitive monitoring device such as lamp L1 and the photopositive resistor $R_{L1}$ fail-safe operation may be realized. For example, the opening of the feedback loop causes lamp L1 to extinguish, which thereby removes the radiation from photopositive resistor $R_{L1}$. This removal of radiant energy effectively causes resistor $R_{L1}$ to assume its high impedance condition. Thus, an extremely large input impedance is presented to the input signals at the positive terminal of the amplifier 3 so that they are all effectively blocked and accordingly, no erroneous output signal can appear on lead 11. Hence, integrity of the circuit is ensured and its fail-safeness secured.

Figure 3:
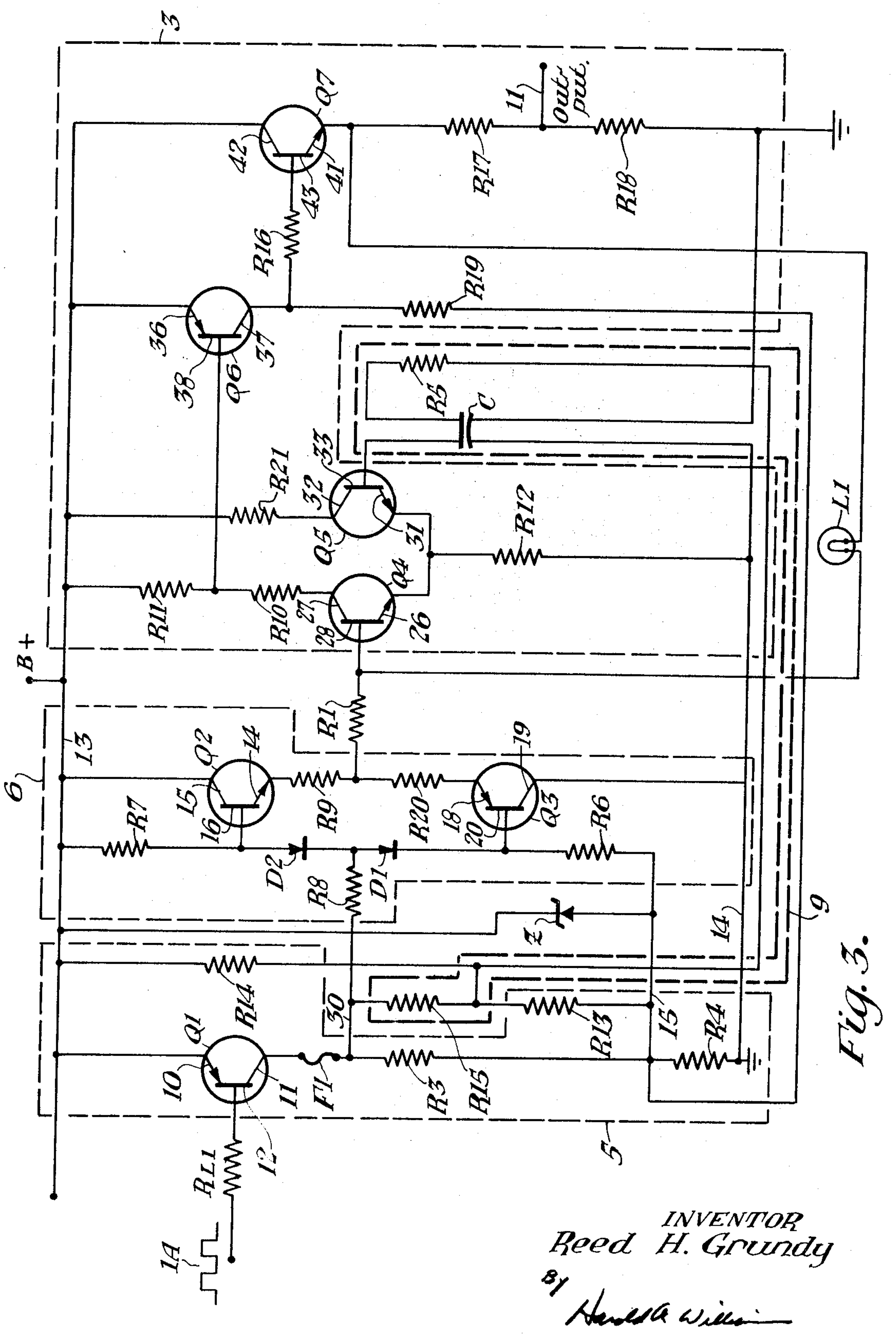
FIG. 3 is a schematic circuit diagram illustrating in more detail the embodiment of FIG. 1.

Turning now to FIG. 3, there are shown the specific elements or components of the duty cycle checking circuit of FIG. 1. As shown, a square wave signal 1A is applied to the cascaded amplifying circuit 2 through photopositive resistor $R_{L1}$. As mentioned above, the photopositive resistor $R_{L1}$has the inherent characteristics of exhibiting a relatively low impedance when suitable radiant energy such as light impinges it, and of assuming a relatively high impedance value when the illuminating rays no longer strike it.

As depicted, the cascaded amplifying circuit 2 takes the form of a multi-stage configuration including a common emitter stage congruous to amplifier circuit 5 of FIG. 1, and an emitter-follower stage including resistive attentuating circuitry and congruous to amplifier 6 of FIG. 1. The common-emitter stage includes a P–N–P transistor $Q_1$, having an emitter electrode 10, a collector electrode 11 and a base electrode 12. The base electrode 12 which is the input terminal of the common emitter is connected to the photopositive resistor $R_{L1}$. The emitter electrode 10 of transistor Q1 is connected to a common lead 13. The common lead 13 is connected to the positive terminal $B^+$ of a suitable supply or potential source, not shown. The collector electrode 11 of transistor Q1 is connected to common lead 15 through a fuse F1 and a loading resistor R3. The collector electrode 11 of transistor Q1 is also connected to a time average circuit 9 including resistor R15, resistor R5 and four terminal capacitor C via fuse F1 and lead 30. A Zener diode z is connected from common lead 13 to common lead 15 across transistor Q1, fuse F1 and resistor R3 to limit the voltage swing at the collector electrode 11 of transistor Q1 and thereby provide for constant peak to peak amplitudes of square wave signals at the collector 11 of transistor Q1. Resistor R4 is connected from common lead 15 which is at a potential of $B^+$- $V_z$ volts, where $V_z$ equals the voltage across Zener diode z to ground to provide current for Zener diode z. Should the Zener diode z be open circuited, resistance R4 is chosen substantially small in comparison to resistance R3 such that common lead 15 will be substantially ground, thereby increasing current flow in R3 and through the fuse F1 to cause failure in the fuse F1 and resulting in an open circuiting of collector 11 of transistor Q1 thereby reducing the collector output to zero. Should Zener diode z be short circuited, the potential at common lead 15 would be substantially $B^+$ and transistor Q1 could not conduct. Resistors R13 and R14 are connected respectively from common leads 13 and 15 to the time averaging circuit 9 and are incorporated as adjustment resistors for permitting the very fine centering of the square wave about the reference voltage necessary to indicate a 50—50 duty cycle.

The emitter follower stage of the cascaded amplifying circuit 2 takes the form of a complementary symmetrical emitter follower including N–P–N transistor Q2 and P–N–P transistor Q3. The transistor Q2 includes an emitter electrode 14, a collector electrode 15, and a base electrode 16 and the transistor Q3 includes an emitter electrode 18, a collector electrode 19, and a base electrode 20. A voltage dividing attentuation network including resistor R8, diodes D1 and D2, and resistors R6 and R7 is connected to the collector electrode output of transistor Q1 via resistor R8. As shown, the combination of resistor R7, diodes D1 and D2, and resistor R6 is connected from common lead 13 to common lead 15. The base electrode 16 of transistor Q2 is connected to the junction of resistor R7 and the anode of diode D2, while the base electrode 20 of transistor Q3 is connected to the junction of resistor R6 and the cathode of diode D1. Diodes D1 and D2 are employed for biasing purposes and ensure that transistors Q2 and Q3 are slightly forward biased. The collector electrode 15 of transistor Q2 is directly connected to lead 13 and the collector electrode 19 of transistor Q3 is directly connected to lead 14. A pair of series connected resistors R9 and R20 interconnects the emitter electrodes 14 and 18 of transistors Q2 and Q3, respectively. As shown, the output from the complementary symmetrical emitter follower stage is derived from the junction of resistors R9 and R20, and is applied to an input of feedback amplifier 3 via resistor R1.

As depicted, the feedback amplifier takes the form of a differential amplifier stage, a switching stage and an emitter follower stage. The differential amplifier is composed of a pair of N–P–N transistors Q4 and Q5. The transistor Q4 includes an emitter electrode 26, a collector electrode 27, and a base electrode 28 and the transistor Q5 includes an emitter electrode 31, a collector electrode 32, and a base electrode 33. The base electrode 28 of transistor Q4 is the positive input terminal as well as the feedback terminal of the amplifier 3. The collector electrode 27 of transistor Q5 is connected to lead 13 through a pair of series connected resistors R10 and R11. The collector electrode 32 of transistor Q5 is connected to lead 13 via load resistor R21. The emitter electrodes 26 and 29 of transistors Q4 and Q5, respectively, share a common resistor R12 which is connected to lead 14. The base electrode 33 of transistor Q5, which is the negative input terminal of the amplifier 3 is connected to the time averaging circuit 9 through one terminal of the four terminal capacitor C. A four terminal capacitor is employed to ensure that in the event of a failure in the capacitor C, such as a terminal break, time averaging will not occur and amplifier 3 will not produce an output due to the lowering of the upper and lower hysteresis levels beyond a point where both are intersected by the square wave input to amplifier 3. The switching stage includes a P–N–P transistor Q6 having an emitter electrode 36, a collector electrode 37 and a base electrode 38. The base electrode 38 is directly connected to the junction of resistors R10 and R11, while the emitter electrode 36 is directly connected to lead 13. The collector electrode 37 is connected to the junction of resistors R16 and R19. The resistor R19, which is also connected to lead 15 at one end of resistor R5 at potential $B^+-V_z$ limits the voltage swing of collector electrode 37 of transistor Q6 to ensure constant peak to peak magnitude square wave signals at the collector electrode 37 of transistor Q6. It will be noted that this connection is not shown in FIG. 1 since it is incorporated only for referencing purposes and forming no part of the inventive concepts herein. Resistor R16 feeds the square wave signal at collector electrode 37 of transistor Q6 to the emitter follower stage, namely to N–P–N transistor Q7 of amplifier 3 which is employed to provide the low impedance necessary for driving the lamp L1 in the feedback circuit of amplifier 3. The transistor Q7 has an emitter electrode 41, a collector electrode 42 and a base electrode 43. The base electrode 43 is directly connected to the resistor R16, while the collector electrode 42 is directly connected to the lead 13. A pair of series connected resistors R17 and R18 connect the emitter electrode 41 of transistor Q7 to lead 14. In the present instance, the feedback loop or path of the amplifier 3 extends from the emitter electrode 41 of transistor Q7 through the lamp L1 to the base electrode 28 of transistor Q4. In FIG. 3, the internal resistance of the lamp L1 is equivalent to the separately shown resistor $R_F$in FIG. 1. It will also be seen that the junction between resistors R17 and R18 operates as the output of the amplifier 3, namely, lead 11, which is connected to a suitable output circuit, not shown.

Turning now to the operation of the fail-safe duty cycle checking circuit, it will be initially assumed that the necessary operating potentials are applied to the circuit, and that the circuit is intact and functions properly. Under this condition, the lamp L1 is illuminated and the radiant energy or light striking resistor $R_{L1}$causes the resistance thereof to be reduced to a relatively low value. Let it further be assumed that initially neither transistor Q4 nor transistor Q5 is conducting and hence, neither are transistors Q6 nor Q7. The illumination path for lamp L1 is provided from the $B^+$ battery terminal through resistor R7, base electrode 16 and emitter electrode 14 of transistor Q2, resistor R9, resistor R1, lamp L1, resistor R17, and resistor R18 to ground. It will be appreciated that this quiescent condition will continue until some overriding signal is applied to the input of the duty cycle checking circuit. Let us assume that a square wave signal having a 50—50 duty cycle is present at photosensitive resistor $R_{L1}$under an ideal condition of no noise or other random signal effects. Under such a condition the square wave signal is referenced to $B^+$ at the upper limit and $B^+ - V_z$ at the lower limit at the collector electrode 11 of transistor Q1, to thereby have a peak to peak amplitude of $V_z$ due to the presence of Zener diode z. The signal is then attenuated by the resistive attenuating circuitry including resistors R8, R6, and R7 and diodes D1 and D2, the peak to peak amplitude of the input to the emitter follower circuitry being attenuated and centered about $$B^+ - \frac{V_Z}{2}$$

assuming that resistors R7 and R6 are equal. The emitter follower circuit having less than unity gain, the output is substantially equal to the input and is centered at $$B^+ - \frac{V_Z}{2}$$

assuming the equality of resistors R9 and R20, and will take the form of the square wave of waveform $W_a$of FIG. 2. This waveform is applied at the base electrode 28 of transistor Q4, or the positive terminal of amplifier 3. The voltage at the collector electrode 11 of transistor Q1 is also delivered through time averaging means 9, including resistor R15 and R5 and capacitor C tor provide a signal level at $$B^+ - \frac{V_Z}{2}$$

at the base electrode 33 of transistor Q5, or the negative terminal of amplifier 3. $V_2$ and resistors R6, R7, and R8 are chosen in the preferred embodiment such that for a waveform having a 50—50 duty cycle the upper hysteresis level of amplifier 3 assumes a value one tenth of the peak to peak amplitude of the attenuated square wave down from the upper peak of the wave present at 50 —50 duty cycle and such that the lower hysteresis level of amplifier 3 assumes a value one tenth of the peak to peak amplitude of the attenuated square wave up from the lower peak of the wave at 50 —50 duty cycle to allow for a ±10 percent tolerance, i.e., to also allow duty cycles between 60 –40 and 40–60. In the specific instance, it will be seen that with the presence of an alternation intersecting the upper hysteresis level, current will flow toward the base electrode 28 of transistor Q4 and transistor Q4 will being conducting. The conduction of transistor Q4 establishes a path from the $B^+$ terminal through resistors R11 and R10 through collector electrode 27, base electrode 28 and emitter electrode 26 of transistor Q4 through resistor R12 to ground. The polarity of the voltage across R12 is such that the emitter electrode 31 of the transistor Q5 is more positive than the base electrode 33 of transistor Q5 and therefore, transistor Q5 is not conducting. The turning on of transistor Q4 causes a forward biasing of the base-emitter electrodes 38 – 36 of transistor Q6 so that the switching transistor Q6 is turned on. The conduction of transistor Q6 forward biases transistor Q7 and transistor Q7 is turned on and the output of amplifier 3 goes to $B^+$.

Upon an alternation of the square wave intersecting the lower hysteresis level, the potential and polarity across resistor R12 is now such that the emitter electrode 26 of transistor Q4 is more positive than the base electrode 28 of transistor Q4, thus reverse biasing the transistor Q4 and causing it to be turned off. The non-conduction of transistor Q4 breaks the path through resistor R12 causing the potential of the emitter electrode 26 of transistor Q4 to decrease in amplitude to that value set by the emitter electrode 31 of transistor Q5 which has its base electrode 33 connected to one terminal of capacitor C which is at a potential determined by the time averaging means 9. Hence, with emitter electrode 31 of transistor Q5 connected at the aforementioned potential, it will be seen that the base-emitter junction 28–26 of transistor Q4 will become reverse biased and hence Q4 is rendered non-conducting. The nonconduction of transistor Q4 causes the switching transistor Q6 and, in turn, transistor Q7 to turn off. The turning off of transistors Q6 and Q7 causes the output to shift to the $B^+ - V_z$ potential. It will be appreciated that the output at emitter 41 of transistor Q7 will shift between the two saturation levels, namely, $B^+$ and $B^+ - V_z$ so long as the level of the periodic input alternately intersects the upper and the lower hysteresis levels. Resistor R17 is an adjustment resistor employed to permit the output voltage swing at lead 11 to be somewhat less in value than that at emitter electrode 41 of transistor Q2.

Let us now assume that the square wave input at photoresistor $R_{L1}$has a duty cycle outside of the permissible range, for example, a 70–30 duty cycle. Accordingly, the attenuated waveform at resistor R1 is still centered about $$B^+ - \frac{V_Z}{2}$$

due to the equality of resistors R7, R8, R9, and R20. However, the time average of the waveform at collector electrode 11 of transistor Q1 is now at $B^+$ $0.3V_z$ , i.e., 0.2Vabove the time average of a square wave having a 50—50 duty cycle. As a result, the upper and lower hysteresis levels, being centered about the time average of the square wave, also are raised an amount approximately equal to 0.22V. The attenuated 70–30 waveform, with the raised time average and hysteresis levels is similar to that shown in waveform $W_b$of FIG. 0. It will be appreciated that since the peak to peak amplitude of the waveform remains constant and since the waveform is fixed, the upper hysteresis level H3 is not intersected by any portion of the square wave signal. Accordingly, transistor Q4 is incapable of conducting, and transistor Q5 will remain conducting. Since transistor Q4 is not conducting, both transistors Q6 and Q7 are reverse biased and the output will remain at the $B^+$ —Vlevel.

Finally, let us assume that the square wave at photoresistor $R_{L1}$has a duty cycle of 30–70. Once again, the attenuated waveform at resistor R1 is still centered about $$B^+ - \frac{V_Z}{2}$$

. However, due to the 30-70 duty cycle of the square wave input, the time average of the waveform at the collector electrode 11 of transistor Q1 is now at $B^+ - 0.7V_z$ , i.e., $0.2V_z$ below the time average of a square wave having a 50—50 duty cycle. The upper and lower hysteresis levels, being centered about the time average of the square wave, are also lowered an amount approximately equal to $0.2V_z$ . The attenuated 30–70 waveform, with the lowered time average and hysteresis levels is similar to that depicted in waveform $W_c$in FIG. 2. Once again, it will be appreciated that the peak to peak amplitude of the attenuated waveform remains constant, and since the waveform is fixed, the lower hysteresis level H6 is not intersected by any portion of the attenuated square wave signal. Accordingly, transistor Q4 is turned on upon the first alternation intersecting the upper hysteresis level to provide a path through resistor R12. Once again, the polarity and potential of resistor R12 are such that the emitter electrode 31 of transistor Q5 is more positive than the base electrode 33 of transistor Q5 and will remain more positive since transistor Q4 cannot be turned off unless the lower hysteresis level is intersected by an alternation of the square wave, as previously described with respect to a 50—50 duty cycle square wave. Hence, transistor Q5 will remain nonconducting. Accordingly, with transistor Q4 conducting, transistors Q6 and Q7 are forward biased and will turn on. However, since Q5 cannot be turned on, the output will remain at the $B^+$ level for the duration of the waveform.

As previously mentioned, the lamp L1 monitors the condition of the feedback loop of the amplifier 3 and ensures that an unsafe failure, namely, an open circuit condition is incapable of reducing the hysteresis levels. For example, an open feedback loop extinguishes the lamp L1 and the lack of illumination upon photopositive resistor $R_{L1}$ causes it to assume a relatively high resistance. Thus, the high input resistance blocks any input signal which could cause an erroneous output signal. It will be appreciated that special precautions are taken to ensure that the critical resistive elements of the duty cycle checking circuit will not become short-circuited. That is, by employing carbon composition types of resistors the possibility of a shorted resistive element is eliminated. Further, it will be appreciated that the opening or shorting of an active element either destroys the necessary amplification qualities of a particular stage or upsets the necessary biasing potentials to an extent that no output is produced. Thus, the duty cycle checking circuit operates in a fail-safe manner to provide an output signal when the peak values of a square wave input are in excess of the values of the hysteresis levels of the duty cycle checking circuit which vary with the duty cycle of the square wave.

While my invention has been described with regard to a duty cycle checking circuit for cab signaling applications, it will be understood that the invention may have utility in other systems and unrelated areas remote from mass and/or rapid transit. Further, it will be understood that opposite types of transistors may be employed to those shown simply by reversing the polarities of diodes z, D1, and D2 and the DC supply source.

Still further, any type of light emitting source may be employed in the feedback loop of the amplifier in conjunctive operation with photoresistor $R_L$, as for example, a light emitting diode.

Therefore, it will be understood that the foregoing description of my invention is only illustrative and it is not intended that the invention be limited thereto. Thus, sundry variations, alterations, and modifications may be made by those skilled in the art without departing from the spirit and scope of my invention.

Having thus described my invention, what I claim is:

1. A fail-safe duty cycle checking circuit comprising a. an amplifying circuit means having a first and a second input and an output, said first input of said amplifying circuit means for receiving a square wave input signal of fixed peak to peak amplitude, said second input of said amplifying circuit for receiving a reference signal proportional to the duty cycle of said square wave input signal, b. a feedback loop connected between said output and said first input of said amplifying circuit means for providing an upper and a lower hysteresis level, said reference signal effective to shift said upper and said lower hysteresis levels upward whenever said duty cycle of said square wave input signal is greater than a predetermined duty cycle value and downward whenever said duty cycle of said square wave input signal is less than said predetermined duty cycle value, the raising and lowering of said upper and said lower hysteresis levels by said reference signal beyond preselected upper and lower values rendering said amplifying circuit means incapable of producing an output signal on said output of said amplifying circuit means and, c. a photosensitive means having a radiant energy source connected in said feedback loop for monitoring the condition thereof and having a photoresistive element connected to said first and said second inputs of said amplifying circuit means and responsive to said radiant energy source, and photoresistive element assuming a high impedance whenever said radiant energy source emits no radiant energy due to a component failure in said feedback loop to thereby render any square wave input signal incapable of causing an output from said amplifying circuit means during a component failure in said feedback loop.

2. The fail-safe duty cycle checking circuit as defined in claim 1, wherein said amplifying circuit means includes a differential amplifier means having a first and a second input and an output, said feedback loop being connected between said output and said first input of said differential amplifier means, said photoresistive element being connected to said first and said second input of said differential amplifier means.

3. The fail-safe duty cycle checking circuit as defined in claim 1, wherein said reference signal is a time average of said square wave input signal.

4. The fail-safe duty cycle checking circuit as defined in claim 1, wherein said feedback loop provides regenerative feedback to said first input of said amplifying circuit means.

5. The fail-safe duty cycle checking circuit as defined in claim 1, wherein said radiant energy source comprises a light bulb.

6. The fail-safe duty cycle checking circuit as defined in claim 1, wherein said photoresistive element comprises a photopositive resistor.

7. The fail-safe duty cycle checking circuit as defined in claim 1, wherein a cascaded amplifying circuit is interposed between said photoresistive means and said first input of said amplifier circuit means.

8. The fail-safe duty cycle checking circuit as defined in claim 7, wherein a current-limiting resistor electrically couples said cascaded amplifying means to said amplifying circuit means.

9. The fail-safe duty cycle checking circuit as defined in claim 8, wherein said upper and lower hysteresis levels are proportional to the ratio of the impedance of said feedback loop and the impedance of said current limiting resistor.

10. The fail-safe duty cycle checking circuit as defined in claim 7, wherein said cascaded amplifying circuit comprises first and second stages, said first stage being a common emitter amplifying means having an input connected to said photoresistive element and producing an output which is a square wave signal of fixed peak to peak amplitude, said second stage comprising an emitter follower amplifying means having an input connected to said output of said common emitter amplifying means and attenuating said output of said common emitter amplifying means, and an output of less than unity gain connected to said first input of said amplifying circuit means.

11. The fail-safe duty cycle checking circuit as defined in claim 10, wherein a Zener diode and a fuse are interconnected in said first stage of said cascaded amplifying circuit for ensuring a constant peak to peak amplitude at said output of said first stage of said cascaded amplifying circuit, as well as at said output of said amplifier circuit means, said constant peak to peak amplitude unable to increase in value since failure of said Zener diode causes said fuse to open-circuit rendering said fail-safe duty cycle checking circuit inoperable.

12. The fail-safe duty cycle checking circuit as defined in claim 10, wherein a time averaging means is connected to said square wave signal output of said common emitter amplifying means to provide an output which is a time average of said square wave signal output of said common emitter amplifying means and which is connected as said second input to said amplifying circuit means.

13. The fail-safe duty cycle checking circuit as defined in claim 1, wherein said upper and lower hysteresis levels are equally displaced from a level which is the time average of said square wave input signal.

14. A fail-safe duty cycle checking circuit comprising a. a cascaded amplifying circuit having a first and a second stage, each having an input and an output, said first stage input connected for receiving a square wave input signal, said first stage fixing the peak to peak amplitude of said square wave input signal and said fixed peak to peak amplitude square wave appearing on said first stage output and delivered to said second stage input, said second stage attenuating and centering said fixed peak to peak amplitude square wave, the attenuated square wave produced on said second stage output, b. time averaging means having an input connected to said output of said first stage of said cascaded amplifying circuit and an output which is proportional to the duty cycle of said fixed peak to peak amplitude square wave, c. an amplifying circuit means having a first and a second input and an output, said first input of said amplifying circuit means electrically connected to said output of said second stage of said cascaded amplifying circuit, said second input of said amplifying circuit electrically connected to said output of said time averaging means, said amplifying circuit means comprising 1. a differential amplifier stage having a positive input and a negative input, said positive input of said differential amplifier stage being said first input of said amplifying circuit means, said negative input of said differential amplifier stage being said second input of said amplifying circuit means, said differential amplifier stage including in combination a first and a second transistor device each having an emitter electrode, a collector electrode and a base electrode, the base electrode of said first transistor device being said positive input of said differential amplifier stage, the collector electrode of said first transistor device electrically connected to a first preselected positive saturation voltage potential through series connected first and second resistive elements, the collector electrode of said second transistor device electrically connected to said first voltage potential through a third resistive element, the emitter electrodes of said first and second transistor devices electrically connected to a first preselected reference voltage potential through a common fourth resistive element, the base electrode of said second transistor device being said negative input of said differential amplifier stage, and electrically connected to said output of said time averaging means,
2. a switching stage including a third transistor device having an emitter electrode, a collector electrode, and a base electrode, said base electrode of said third transistor device directly connected to the junction of said first and second resistive elements, said emitter electrode of said third transistor device connected directly to said first positive potential, said collector electrode of said third transistor electrically connected to a second reference voltage potential which is more positive than said first reference voltage potential and is the level of the lower peak of said fixed peak to peak amplitude square wave, and
3. a low impedance output stage including a fourth transistor device having an emitter electrode, a collector electrode, and a base electrode, said base electrode of said fourth transistor device electrically connected to said collector electrode of said third transistor device through a fifth resistive element, said collector electrode of said fourth transistor device directly connected to said first positive voltage potential, said emitter electrode of said fourth transistor device connected to said first reference voltage potential through series connected sixth and seventh resistive elements, said output of said amplifying circuit means taken from the junction of said sixth and seventh resistive elements, d. a feedback loop connected between said output of said amplifier circuit means and said positive input of said differential amplifier stage for providing an upper and a lower hysteresis level, said time averaging means output effective to shift said upper and lower hysteresis levels upward whenever said duty cycle of said fixed peak to peak amplitude square wave is greater than a predetermined duty cycle value and downward whenever said duty cycle of said fixed peak to peak amplitude square wave is less than said predetermined duty cycle value, and e. a photosensitive means having a radiant energy source connected in said feedback loop for monitoring the condition thereof and having a photoresistive element connected to said input of said first stage of said cascaded amplifying means and responsive to said radiant energy source, said photoresistive element assuming a high impedance condition whenever said radiant energy source emits no energy to thereby render any square wave input signal incapable of causing an output from said amplifying circuit means during a component failure in said feedback loop.

15. The fail-safe duty cycle checking circuit as defined in claim 14, wherein said feedback loop provides regenerative feedback to said first input of said amplifying circuit means.

16. The fail-safe duty cycle checking circuit as defined in claim 14, wherein said radiant energy source comprises a light bulb.

17. The fail-safe duty cycle checking circuit as defined in claim 14, wherein said photoresistive element comprises a photopositive resistor.

18. The fail-safe duty cycle checking circuit as defined in claim 14, wherein said upper and lower hysteresis levels are equally displaced from a level which is the time average of said square wave input signal.

19. The fail-safe duty cycle checking circuit as defined in claim 14, wherein a current-limiting resistor electrically couples said cascaded amplifying means to said amplifying circuit means.

20. The fail-safe duty cycle checking circuit as defined in claim 19, wherein said upper and lower hysteresis levels are proportional to the ratio of the impedance of said feedback loop and the impedance of said current limiting resistor.

* * * * *